US009577951B2

(12) United States Patent
Ayachitula et al.

(10) Patent No.: US 9,577,951 B2
(45) Date of Patent: *Feb. 21, 2017

(54) ORCHESTRATED PEER-TO-PEER SERVER PROVISIONING

(71) Applicant: International Business Machines Corporation, Armonk, NY (US)

(72) Inventors: Naga A. Ayachitula, Elmsford, NY (US); Genady Grabarnik, Scarsdale, NY (US); James S. Lipscomb, Yorktown Heights, NY (US); Larisa Shwartz, Scarsdale, NY (US); Maheswaran Surendra, Croton-on-Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/989,789

(22) Filed: Jan. 6, 2016

(65) Prior Publication Data

US 2016/0119249 A1    Apr. 28, 2016

Related U.S. Application Data

(63) Continuation of application No. 11/424,901, filed on Jun. 19, 2006, now Pat. No. 9,250,972.

(51) Int. Cl.
*G06F 17/30* (2006.01)
*H04L 12/911* (2013.01)
(Continued)

(52) U.S. Cl.
CPC ............ *H04L 47/78* (2013.01); *G06F 9/5061* (2013.01); *G06F 17/30091* (2013.01);
(Continued)

(58) Field of Classification Search
CPC ..................... G06F 17/30091; H04L 29/06
See application file for complete search history.

(56) References Cited

U.S. PATENT DOCUMENTS

2002/0057684 A1    5/2002  Miyamoto et al.
2004/0260701 A1*  12/2004  Lehikoinen ......... G06F 17/3089
(Continued)

OTHER PUBLICATIONS

Vlaeminck, K., et al; Design and Implementetion of an Application Server Load Balancing Architechture supporting the end-to-end Provisioning of Value-Added Services; Telecommunications Network Strategy and Planning Symposium. Networks 2004., pp. 345-350.

(Continued)

*Primary Examiner* — Mohammad S Rostami
(74) *Attorney, Agent, or Firm* — Steven M. Greenberg, Esq.; CRGO Law

(57) ABSTRACT

Embodiments of the present invention address deficiencies of the art in respect to server provisioning in a heterogeneous computing environment and provide a method, system and computer program product for secure and verified distributed orchestration and provisioning. In one embodiment of the invention, a server provisioning method can be provided. The server provisioning method can include establishing grouping criteria, grouping different target computing nodes into different groups of target computing nodes according to the established grouping criteria, server provisioning a root node in each of the different groups of target computing nodes, and relying upon the root node in each of the different groups to peer-to-peer server provision remaining nodes in each of the different groups.

18 Claims, 3 Drawing Sheets

(51) Int. Cl.
 *G06F 9/50* (2006.01)
 *H04L 12/24* (2006.01)
 *H04L 29/08* (2006.01)
(52) U.S. Cl.
 CPC ........ *H04L 41/0893* (2013.01); *H04L 67/104* (2013.01); *H04L 67/1055* (2013.01); *H04L 67/34* (2013.01); *G06F 2209/5011* (2013.01)

(56) References Cited

U.S. PATENT DOCUMENTS

| 2005/0028001 | A1* | 2/2005 | Huang | H04L 63/06 726/2 |
| 2005/0047327 | A1* | 3/2005 | Saleh | H04L 45/02 370/221 |
| 2005/0060202 | A1* | 3/2005 | Taylor | G06F 19/3418 705/2 |
| 2005/0108423 | A1 | 5/2005 | Centemeri | |
| 2007/0162460 | A1* | 7/2007 | Long | G06F 8/68 |

OTHER PUBLICATIONS

Silverman, B., et al; An Event-based Framework for converged Service Provisioning; Technology of Object-Oriented Languages & Systems; 2000; TOOLS-Pacific 2000, pp. 24-34.
Semret, N. et al; Peering and Provisioning of Differentiated Internet Seevices; INFOCOM 2000; 19th Annual Joint Conferente of IEEE; vol. 2, Mar. 26-30, 2000; pp. 414-420.
Chandra, A, et al; Impact of Space-Time Multiplexing Gnanulaft on Provisioning in On-Demand Data-Cariters: Opportunities and Challenges; http://citeseer.ill.unizh.ch/622512.html; pp. 1-10.

* cited by examiner

ORCHESTRATED PEER-TO-PEER SERVER PROVISIONING

CROSS-REFERENCE TO RELATED APPLICATIONS

This application is a Continuation of U.S. Pat. No. 9,250,972 B2, filed Jun. 19, 2006 and patented on Sep. 22, 2015, the entirety of which is incorporated herein by reference.

BACKGROUND OF THE INVENTION

Field of the Invention

The present invention relates to the field of server provisioning and more particularly to server provisioning to heterogeneous target platforms and/or heterogeneous tasks.

Description of the Related Art

The enterprise has evolved over the past two decades from the smallest of peer to peer networks running multi-user applications without coordination, to massive distributed computing systems involving dozens of servers and thousands of clients across a vast geographical expanse. In the earlier days of enterprise class computing, deploying multi-user applications often involved nothing more than installing an application in a centralized location and providing communicative access to the different users over a small, computer communications network. Evolved configurations involved client-server computing where the power of the client computers could be exploited to support the execution of the application logic and the application data could be served from a central location.

The demands of modern enterprise class computing require more than simplistic client-server arrangements and involve the distributed deployment of multiple applications and application components across multiple different servers in different local networks banded together over a wide area utilizing high speed broadband communicative links. Creating an enterprise environment for single installation can be treated as a laboratory experiment and trial-and-error tactics rule the day. Where the installation must be repeated with consistency across installations, however, a more coordinated approach must be followed. A coordinated approach particularly can be important where customers receive the installation or the application itself as a product or service. In this circumstance, customers cannot tolerate an imperfect installation or an installation that appears to be more of a laboratory experiment than a coordinated effort.

Generally speaking, within the enterprise class environment, the coordinated installation of an application across one or more server computing platforms in a repeatable fashion has come to be known as "server provisioning" borrowing a term from the field of telecommunications. Server provisioning literally implies the deployment of an application onto a host computing platform in a coordinated and repeatable fashion. In the simplified provisioning exercise, an operator installs and configures the various applications in the host computing platform according to a pre-defined installation plan ordinarily specified by an application manufacturer or a systems integrator.

In as much as only a single host computing platform and host operating systems are to be considered in the course of the simplified provisioning exercise, the process can be relatively straightforward. In the larger enterprise, however, the process can be quite complex. So complex has server provisioning become, several manufacturers have developed automated tools for managing the server provisioning process. In conventional server provisioning tools, a set of applications and applications can be configured in a master arrangement and the master arrangement can be replicated to a target platform. Unfortunately, conventional server provisioning tools rely heavily on the nature of the target platform and are hardwired to a specified platform. To that end, conventional server provisioning tools are ill-equipped to handle heterogeneous computing environments including multiple different target platform types.

BRIEF SUMMARY OF THE INVENTION

Embodiments of the present invention address deficiencies of the art in respect to server provisioning in a heterogeneous computing environment and provide a novel and non-obvious method, system and computer program product for secure and verified distributed orchestration and provisioning. In one embodiment of the invention, a server provisioning method can be provided. The server provisioning method can include establishing grouping criteria, grouping different target computing nodes into different groups of target computing nodes according to the established grouping criteria, server provisioning a root node in each of the different groups of target computing nodes, and relying upon the root node in each of the different groups to peer-to-peer server provision remaining nodes in each of the different groups.

Establishing grouping criteria can include establishing grouping criteria according to a type of target node, a type of server provisioning task, or both. In particular, grouping different target computing nodes into different groups of target computing nodes according to the established grouping criteria can include computing a detailed provisioning task value for each of the target computing nodes indicating a presence and an absence of different components required for server provisioning each of the target computing nodes, and grouping sets of the target computing nodes having similar detailed provisioning task values.

Utilizing the detailed provisioning task value, server provisioning a root node in each of the different groups of target computing nodes can include assembling a bundle for distribution to the root node for each of the different groups of target computing nodes, the bundle including in each instance a set of components required for server provisioning target nodes in a respective group of target nodes. Thereafter, the bundle can be forwarded to the root node.

Finally, relying upon the root node in each of the different groups to peer-to-peer server provision remaining nodes in each of the different groups can include specifying a threshold for available bandwidth and a maximum random delay time for use by peer-to-peer provisioning logic in the root node in determining when to server provision the remaining nodes, and providing a bundle to the root node for distribution to each of the remaining nodes at an interval computed from the threshold and maximum random delay.

In another embodiment of the invention, a server provisioning data processing system can be provided. The system can include an orchestration and provisioning server coupled to multiple target computing nodes over a computer communications network. Each of the target computing nodes can include peer-to-peer provisioning logic including program code enabled to server provision coupled nodes at a lower hierarchical level with a bundle received from a node at a higher hierarchical level. A certificate managing authority also can be coupled to the target computing nodes.

The system further can include orchestration and provisioning logic disposed in the orchestration and provisioning server. The logic can include program code enable to group different ones of the target computing nodes into different hierarchically arranged groups of the target computing nodes according to grouping criteria, and to server provisioning a root node in each of the different groups of target computing nodes. The grouping criteria can include only target computing node type, only provisioning task type, or both target computing node type and provisioning task type.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for orchestrated peer-to-peer server provisioning. In accordance with an embodiment of the present invention, different target peers in a pool of server targets in a computing enterprise can be grouped according to server provisioning requirements in a peer hierarchy. The server provisioning requirements can relate to the set of components required to be deployed onto a particular target based upon the presence and the absence of specific components required for a complete deployment. In this regard, the set of required components can vary according to the type of peer targeted to receive the deployment, the type of deployment task, or both the type of peer and the type of deployment task.

Thereafter, different server provisioning bundles can be assembled for delivery to the peers in the different groups along with a specification of the server provisioning tasks to be performed in order to complete the deployment in the target group of peers. Notably, each peer in each different group can be enabled to receive the bundle and the instructions and to further deploy the bundle and the instructions to other coupled peers at lower levels in the hierarchy. In this way, a set of target peers directly receiving a server provisioning bundle can be substantially less than the set of target peers intended to receive the server provisioning bundle and the responsibility of server provisioning can be shared with the nodes in the target group of peers.

Figure 1:
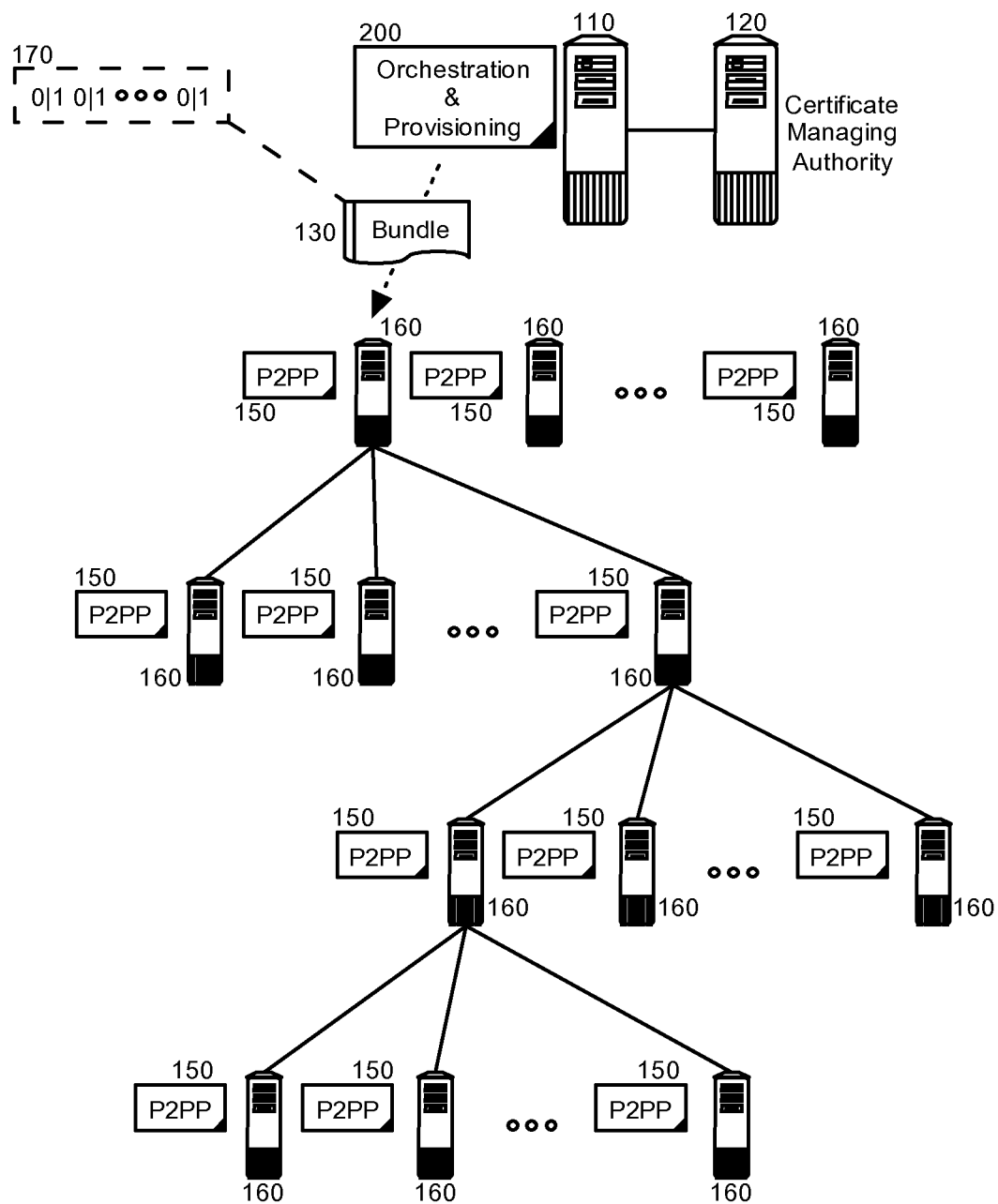
FIG. 1 is a schematic illustration of a computing enterprise configured for orchestrated peer-to-peer server provisioning.

In illustration, FIG. 1 is a schematic illustration of a computing enterprise configured for orchestrated peer-to-peer server provisioning. The computing enterprise can include multiple, heterogeneous target computing nodes 160 communicatively coupled to one another over a computer communications network. Each of the target computing nodes 160 can include computing structure and a corresponding operating system in order to enable each of the target computing nodes 160 to host and manage the execution of computing logic.

An orchestration and provisioning server 110 can be coupled to the target computing nodes 160. The orchestration and provisioning server 110 can include knowledge of the target computing nodes 160 such as the location of each of the nodes 160 in terms of network and sub-network, the operating system hosted within each of the nodes 160, the service pack level for each operating system, the fix pack level for each operating system, and the software installed in each of the nodes 160, at both the application and component level. The orchestration and provisioning server 110 further can include a policy that among other parameters, defines the maximum number of servers to be provisioned linearly. The maximum number can be computed according to a number of factors, for example, the processing power of the orchestration and provisioning server 110 as compared to others of the nodes 160, the distribution mechanism for the server provisioning task, e.g. push or pull, and the number of nodes 160 in the environment.

The orchestration and provisioning server 110 can include orchestration and provisioning program logic 200. The orchestration and provisioning logic 200 can include program code enabled to group different ones of the target computing nodes 160 according to provisioning task requirements to fulfill server provisioning for the target computing nodes 160. Specifically, the target computing nodes 160 can be grouped according to the number and identity of components necessary to deploy onto the target computing nodes 160, or the type of provisioning tasks necessary to deploy selected components for server provisioning onto the target computing nodes 160, or both. In one aspect of the invention, the number of groups can be determined according to the policy defining a maximum number of nodes 160 to be provisioned linearly.

Importantly, the program code of the orchestration and provisioning logic 200 can be further enabled to compute a set of metrics for a detailed provisioning task (DPT) 170. The DPT 170 can specify a minimal set of components for a provisioning task and can represent the presence and the absence of different required components in a particular one of the target computing nodes 160. The different required components can vary according to the specific type of the provisioning task, or the type of type of the particular one of the target computing nodes 160. As an example, a value of "0" can represent the absence of a required component, while the value of "1" can represent the presence of a required component. In this way, a single value can encode the set of required components that must be installed onto a specified one of the target computing nodes 160 in order to fulfill a provisioning task.

The program code of the orchestration and provisioning logic 200 yet further can be enabled to compare the DPT 170 for each of the target computing nodes 160 in order to group clusters of the target computing nodes 160 according to similar metrics. In particular, those of the target computing nodes 160 having the most similar set of metrics in a DPT 170 can be considered to require a similar set of components in order to complete a server provisioning task. Consequently, a collection of components necessary to meet the requirements of a server provisioning task for a group of the target computing nodes 160 can be assembled in a bundle 130, such as an Open Services Gateway Initiative (OSGI) bundle, and provided to the group for provisioning onto the target computing nodes 160 in the group.

Notably, each of the target computing nodes 160 in the group can include peer to peer provisioning (P2PP) logic 150. The P2PP logic 150 can include program code enabled to receive the bundle 130 and apply the bundle 130 to other coupled ones of the target computing nodes 160 in the group of target computing nodes 160. In this way, the program code of the orchestration and provisioning logic 200 need only apply the bundle 130 to a root node in the group of target computing nodes 160. The P2PP logic 150 of the root node in the group of target computing nodes 160 in turn can apply the bundle to other nodes in the group of target computing nodes 160 and so forth.

Finally, a certificate managing authority 120 can be communicatively coupled to the orchestration and provisioning server 110 and to each of the target computing nodes 160. The certificate managing authority 120 can be configured to verify on request the source of the bundles 130 so as to ensure a secure environment for server provisioning.

Figure 2:
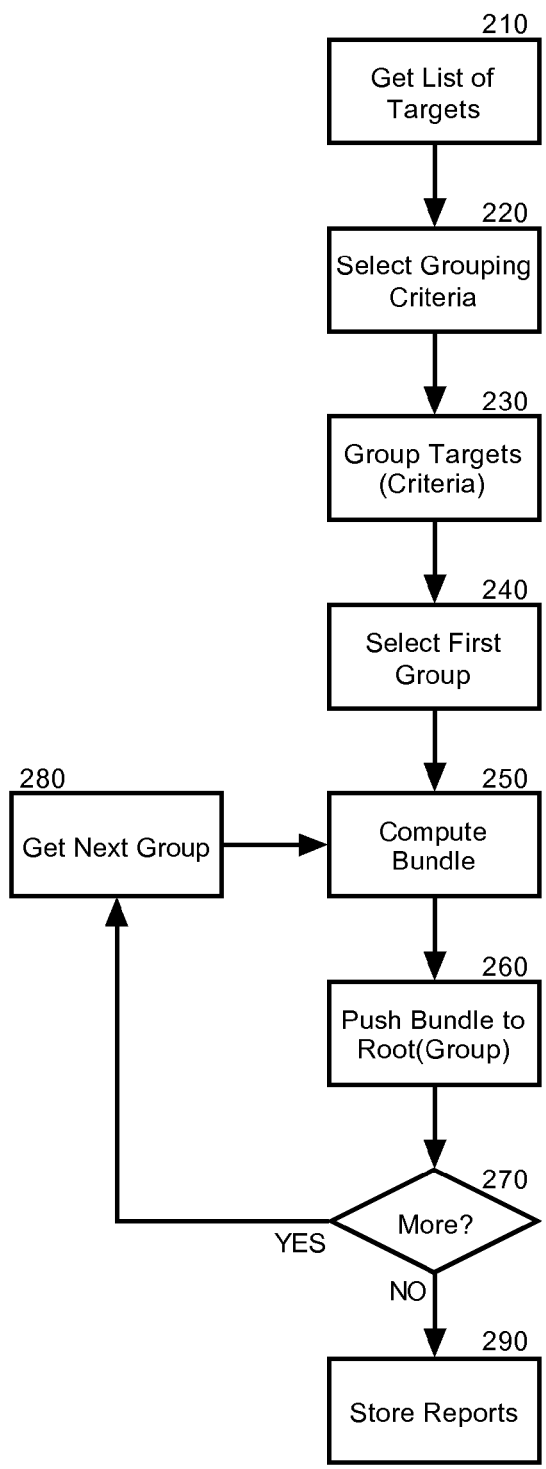
FIG. 2 is a flow chart illustrating a process for orchestrated peer-to-peer server provisioning; and, FIG. 3 is a flow chart illustrating a peer-driven process of server provisioning in the computing enterprise of FIG. 1.

In more particular illustration of the operation of the orchestration and provisioning logic 200, FIG. 2 is a flow chart illustrating a process for orchestrated peer-to-peer server provisioning. Beginning in block 210, a list of target nodes can be selected for server provisioning. In block 220, criteria for grouping the target nodes can be selected. The criteria can include the similarity in the number and type of components to be installed as compared to those components already present in the nodes. The number and type of components can vary not only according to node type (e.g. type of host operating system), but also according to task type (e.g. type of application to be installed, or installation operation that can vary from an installation to an updating to an un-installation).

In block 230, the target nodes can be grouped according to the selected criteria limited only by the number of groups suggested by the policy. In block 240, a first group can be selected for consideration and in block 250, a bundle can be computed for the group. The bundle can include a collection of components and supporting files required to complete server provisioning for the nodes in the group at both the root level and levels below the root level within the hierarchy of the group. Thereafter, in block 260 the bundle can be provided to the root node for the group. The root node in turn can install the requisite components in the bundle and can provide the bundle to nodes below the root node for server provisioning therein.

In decision block 270, if additional groups of nodes remain to be considered, in block 280, a next group of nodes can be selected for consideration and the process can repeat through block 250. In particular, the process can repeat for each computed group wherein each computed group receives a bundle specifically arranged to account for the type of node, the type of provisioning task, or both. When the root nodes of the groups have received and applied the bundles, reports can be generated indicating the results of each of the server provisioning tasks for each of the nodes. The reports can filter back to the orchestration and provisioning server and ultimately can be stored in block 290

Figure 3:
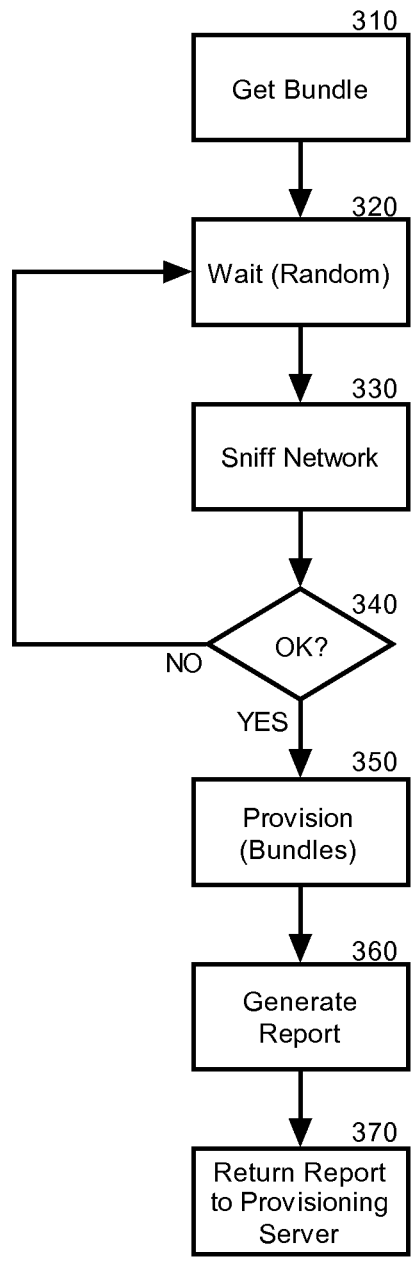

As the P2PP logic in the nodes within each group receive a bundle for distribution to other nodes at lower hierarchical levels, the program code of the P2PP logic can undertake measures to avoid network overloading in the course of peer-to-peer distributing the bundles. In particular, as shown in FIG. 3, beginning in block 310 a node can receive a bundle for use in server provisioning. In block 320, a random period of time can elapse subsequent to which in block 330, the traffic on the network can be sensed to determine available network bandwidth. The random period of time can be specified by the provisioning server along with the receipt of the bundle.

In decision block 340, if sufficient network bandwidth exists, in block 350 the bundle can be provisioned to the next set of nodes at a lower level in the nodal hierarchy within the set of grouped target computing nodes. Thereafter, in block 360, a resulting report can be received from each of the nodes in the next set of nodes and reported back to a provisioning node at a higher hierarchical level in block 270. In this way, each of the nodes at each level in the hierarchy can share in the burden of performing the provisioning task without requiring the provisioning server to provision each node in the hierarchy sequentially.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A server provisioning data processing system comprising:

an orchestration and provisioning server comprising at least one processor and memory and coupled to a plurality of target computing nodes over a computer communications network; and, orchestration and provisioning logic executing in the memory of the orchestration and provisioning server, the orchestration and provisioning logic comprising program code enable to:

group the plurality of target computing nodes into different groups of the target computing nodes according to grouping criteria, server provision a root node in each of the different groups of target computing nodes by applying a bundle to one target computing node in each of the different groups of target computing nodes, where the bundle includes a collection of components and support files required to complete server provisioning for the root node and levels below the root node within a hierarchy of the root node, and, rely upon the root node in each of the different groups to peer-to-peer server provision remaining nodes in each of the different groups resulting in the bundle being applied to at least one level below the root node within the hierarchy of the root node in each of the different groups of target computing nodes.

2. The system of claim 1, further comprising a certificate managing authority coupled to the plurality of target computing nodes.

3. The system of claim 1, wherein each of the plurality of target computing nodes comprises peer-to-peer provisioning logic, the peer-to-peer provisioning logic comprising program code enabled to server provision coupled nodes at a lower hierarchical level with the bundle received from a node at a higher hierarchical level.

4. The system of claim 1, wherein the grouping criteria includes a target computing node type.

5. The system of claim 1, wherein the grouping criteria includes a server provisioning task type.

6. The system of claim 1, wherein the grouping criteria includes both a target computing node type and also a server provisioning task type.

7. The system of claim 1, wherein the orchestration and provisioning logic further comprises program code enabled to:

compute a detailed provisioning task (DPT) value for each of the target computing nodes indicating a presence and an absence of different components required for server provisioning each of the target computing nodes, and group sets of the target computing nodes having similar DPT values.

8. The system of claim 1, wherein the orchestration and provisioning logic comprising program code enabled to server provision the root node in each of the different groups of target computing nodes comprises program code enabled to:

assemble the bundle for distribution to the root node for each of the different groups of target computing nodes, and forward the bundle to the root node.

9. The system of claim 1, wherein the orchestration and provisioning logic comprising program code enabled to rely upon the root node in each of the different groups to peer-to-peer server provision remaining nodes in each of the different groups comprises program code enabled to:

specify a threshold for available bandwidth and a maximum random delay time for use by peer-to-peer provisioning logic in the root node in determining when to server provision the remaining nodes; and, provide the bundle to the root node for distribution to each of the remaining nodes by the peer-to-peer provisioning logic at an interval computed from the threshold and maximum random delay.

10. A provisioning data processing system comprising:

an orchestration and provisioning server comprising at least one processor and memory and coupled to a plurality of target computing nodes over a computer communications network;

orchestration and provisioning logic executing in the memory of the orchestration and provisioning server, the orchestration and provisioning logic comprising program code enabled to:

group the plurality of target computing nodes into different groups of target computing nodes according to grouping criteria, and server provision a root node in each of the different groups of target computing nodes by applying a bundle to one target computing node in each of the different groups of target computing nodes, where the bundle includes a collection of components and support files required to complete server provisioning for the root node and levels below the root node within a hierarchy of the root node, and, peer to peer provisioning logic executing in a memory of the plurality of target computing nodes, the peer to peer provisioning logic comprising program code enabled to:

receive the bundle in one of the plurality of target computing nodes server provisioned as the root node, and apply the bundle to other plurality of target computing nodes grouped with the one of the plurality of target computing nodes provisioned as the root node.

11. The system of claim 10, further comprising a certificate managing authority coupled to the plurality of target computing nodes.

12. The system of claim 10, wherein the grouping criteria includes a target computing node type.

13. The system of claim 10, wherein the grouping criteria includes a server provisioning task type.

14. The system of claim 10, wherein the grouping criteria includes both a target computing node type and also a server provisioning task type.

15. The system of claim 10, wherein the orchestration and provisioning logic further comprises program code enabled to:

compute a detailed provisioning task (DPT) value for each of the target computing nodes indicating a presence and an absence of different components required for server provisioning each of the target computing nodes, and group sets of the target computing nodes having similar DPT values.

16. The system of claim 10, wherein the orchestration and provisioning logic comprising program code enabled to server provision the root node in each of the different groups of target computing nodes comprises program code enabled to:

assemble the bundle for distribution to the root node for each of the different groups of target computing nodes, and forward the bundle to the root node.

17. The system of claim 10, wherein the orchestration and provisioning logic comprising program code enabled to rely upon the root node in each of the different groups to peer-to-peer server provision remaining nodes in each of the different groups comprises program code enabled to:
- specify a threshold for available bandwidth and a maximum random delay time for use by the peer-to-peer provisioning logic in the root node in determining when to server provision the remaining nodes; and,
- provide the bundle to the root node for distribution to each of the remaining nodes by the peer-to-peer provisioning logic at an interval computed from the threshold and maximum random delay.

18. The system of claim 17, wherein the peer-to-peer provisioning logic comprising program code enabled to apply the bundle to other plurality of target computing nodes grouped with the one of the plurality of target computing nodes provisioned as the root node comprises program code enabled to:
- apply the bundle to other plurality of target computing nodes grouped with the one of the plurality of target computing nodes provisioned as the root node at the interval computed from the threshold and maximum random delay.

* * * * *